United States Patent
Gupta

(10) Patent No.: US 10,168,433 B2
(45) Date of Patent: Jan. 1, 2019

(54) POWER CONSERVATION VIA GNSS-WIRELESS ACTIVITY SYNCHRONIZATION

(71) Applicant: Intel IP Corporation, Santa Clara, CA (US)

(72) Inventor: Raghvendra Gupta, Bangalore (IN)

(73) Assignee: Intel IP Corporation, Santa Clara, CA (US)

( * ) Notice: Subject to any disclaimer, the term of this patent is extended or adjusted under 35 U.S.C. 154(b) by 601 days.

(21) Appl. No.: 14/721,938

(22) Filed: May 26, 2015

(65) Prior Publication Data

US 2016/0349378 A1    Dec. 1, 2016

(51) Int. Cl.
*G01S 19/34* (2010.01)
*G01S 19/03* (2010.01)

(52) U.S. Cl.
CPC .................................... *G01S 19/34* (2013.01)

(58) Field of Classification Search
CPC .............................. G06F 1/3203; G01S 19/34
USPC .............. 342/357.4, 357.46, 357.74, 357.77; 701/468, 490
See application file for complete search history.

(56) References Cited

U.S. PATENT DOCUMENTS

| | | | | |
|---|---|---|---|---|
| 5,875,402 A | * | 2/1999 | Yamawaki | H04B 7/212 370/350 |
| 2007/0201591 A1 | * | 8/2007 | Knerr | H04B 7/269 375/365 |
| 2012/0156987 A1 | * | 6/2012 | Nakayama | H04W 56/00 455/13.2 |

* cited by examiner

*Primary Examiner* — Dao L Phan
(74) *Attorney, Agent, or Firm* — Grossman, Tucker, Perreault & Pfleger, PLLC

(57) ABSTRACT

The present disclosure is directed to power conservation via global navigation satellite system (GNSS)-cellular activity synchronization. In general, power may be conserved in a device by setting a GNSS module in a device to operate during a time period when communication resources (e.g., a communication module) in the device are already scheduled to operate, which may conserve power in the device. Synchronization may occur via a notification (e.g., a pulse, a message, etc.) that is transmitted from the communication module to the GNSS module. In this manner, the burden of managing GNSS module operation may be shifted from control resources in the device (e.g., a system module) to the communication module, allowing the system module to remain in a power conservation state (e.g., sleep state) for longer durations and for GNSS signal measurement to occur when the system module is already active.

24 Claims, 4 Drawing Sheets

POWER CONSERVATION VIA GNSS-WIRELESS ACTIVITY SYNCHRONIZATION

TECHNICAL FIELD

The present disclosure relates to device communications, and more particularly, to power conservation in a device through synchronization of satellite and wireless activities in the device.

BACKGROUND

A global navigation satellite system (GNSS) may comprise a constellation of navigation satellites. In general, signals received from the navigation satellites may be utilized to determine a location for the receiver. Example implementations of a GNSS may comprise, for example, the Global Positioning System (GPS) operated by the United States, GLONASS operated by Russia, the Galileo positioning system under development by the European Union and the COMPASS navigation system under development by China. In these systems, a device may measure signals received from various satellites in the constellation to continually update the estimated position of the device. For example, during positioning a GNSS receiver may measure received satellite signals multiple times per second, and may provide the signal measurements to other processing resources in a device to determine an updated position. Constant signal measurement may allow for accurate position determination regardless of whether the device is stationary or moving.

While the benefit of constant signal measurement on positioning accuracy may be readily apparent, negative implications may also exist. For example, the GNSS receiver may constantly require management by system resources in a device that would otherwise be in a power-saving mode. Moreover, GNSS receivers may be integrated into devices (e.g., smart phones) that may also include communication equipment such as, for example, transceivers supporting long-range wireless communication (e.g., cellular), short-range wireless communication (e.g., Bluetooth, wireless local area networking (WLAN), etc.), close-proximity wireless communication (e.g., infrared (IR), radio-frequency (RF), etc.), etc. Some or all of the communication equipment may also interact with the system resources, and as a result, may keep the system resources active for even longer periods of time. In general, the more time that a device remains active, the quicker the device consumes stored energy. This behavior is extremely problematic for mobile devices, wherein a constant battle is being waged to extend the duration of operation between charges.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
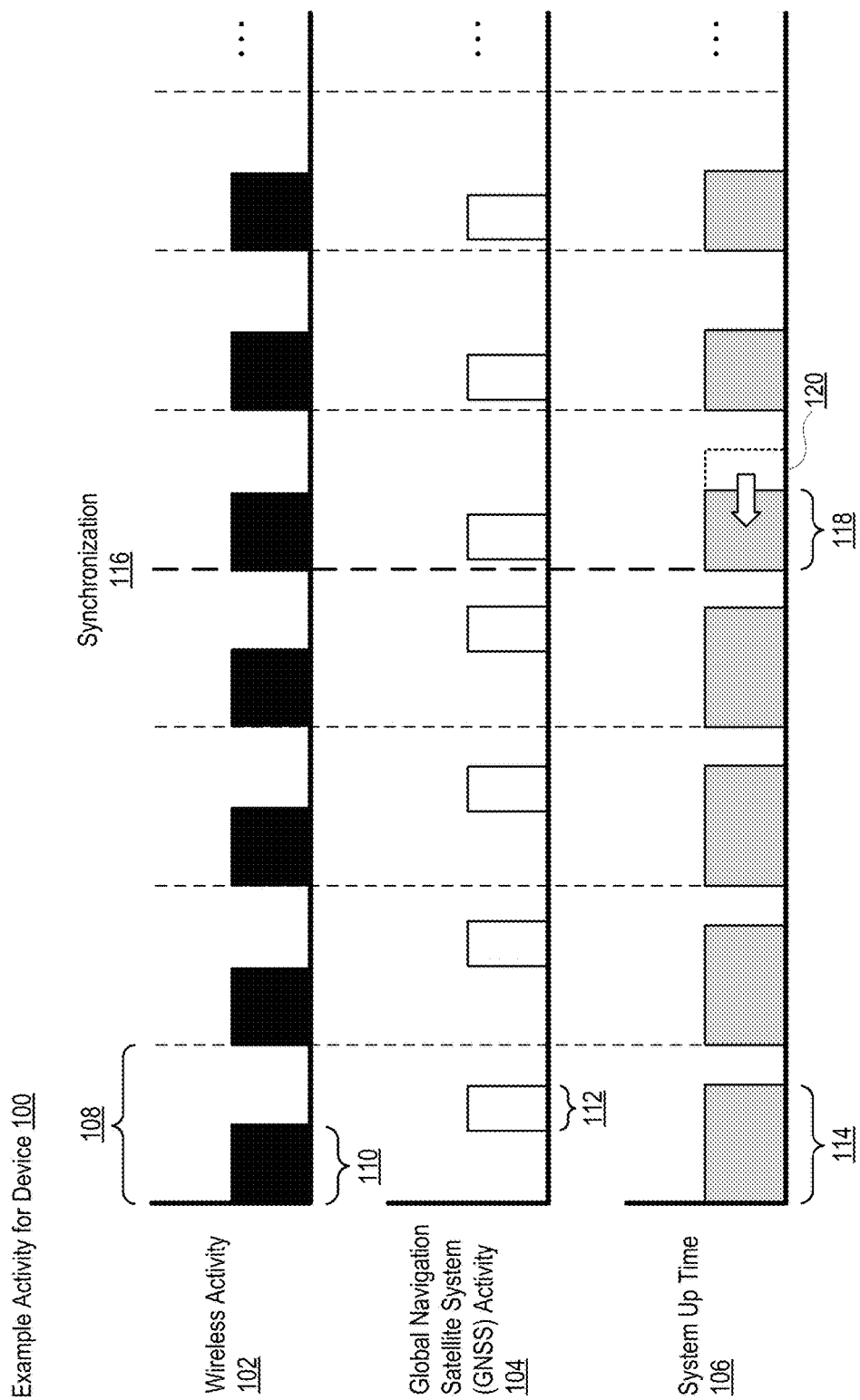
FIG. 1 illustrates an example system for power conservation via GNSS-wireless activity synchronization in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to power conservation via GNSS-wireless activity synchronization. In general, power may be conserved in a device by setting a GNSS module in a device to operate during a time period when communication resources (e.g., a communication module) in the device are already scheduled to operate, which may help to conserve power in the device. Typically, control resources (e.g., a system module) must wake up periodically to control the GNSS module. Shifting the burden of managing GNSS module operation from the system module to the communication module may allow the system module remain in a power conservation state (e.g., sleep state) for longer durations since it no longer has to wake up to control the GNSS module, which may result in a power savings. Then, synchronizing GNSS module operation with scheduled communication module operation allows GNSS signal measurement to occur when the system module is already active interacting with the communication module, and thus, more likely to request updated GNSS signal measurements from the GNSS module. Synchronization may occur via a notification transmitted from the communication module to the GNSS module. The notification may include a pulse, a pulse train, a message and/or a software-based indication.

In at least one embodiment, a device may conserve power via GNSS-cellular activity synchronization. The device may comprise, for example, at least a system module, a GNSS module and a communication module. The system module may be to control operation of the device. The GNSS module may be to at least measure GNSS signals received from at least one satellite. The communication module may be to at least facilitate interaction with other devices via at least one wireless medium and to cause GNSS module operation to become synchronized with communication module operation.

Causing GNSS module operation to become synchronized with communication module operation may comprise, for example, causing the GNSS module to be active during a time period when the communication module is also scheduled to be active. In at least one example implementation, causing GNSS module operation to become synchronized with communication module operation may comprise the communication module transmitting a notification to the GNSS module. An example of a notification may be a message comprising at least a preamble sequence, data and a footer sequence, at least the preamble sequence and the footer sequence allowing the GNSS module to detect a start and an end of a pulse train, respectively. The message data may comprise, for example, synchronization data including at least one of a type of pulse, a frequency of pulse or a radio access technology (RAT) type.

In the same or a different embodiment, the notification may comprise at least one pulse indicating when activity is starting for the communication module. The start of activity for the communication module may comprise, for example, a start of a duration of time wherein at least one of paging operations or cellular signal measurement are performed by the communication module. The notification may also comprise an indication of an opportunity for GNSS module operation provided to the GNSS module by communication module software. The system module may further be to, for example, request the measurements of the GNSS signals from the GNSS module. The GNSS module may further be to provide the measurements of the GNSS signals to the system module upon receiving the request from the system module. In at least one example implementation, GNSS module functionality and the communication module functionality may be integrated within a single module in the device. Consistent with the present disclosure, a method for synchronizing GNSS and cellular activity in a device may comprise, for example, receiving a synchronization notification at a global navigation satellite system (GNSS) module in a device from a communication module also in the device, and initiating measurement of GNSS signals based on the notification.

FIG. 1 illustrates an example system for power conservation via GNSS-wireless activity synchronization in accordance with at least one embodiment of the present disclosure. While the various embodiments disclosed herein may be explained in terms of a GNSS module interacting with a long-range wireless (e.g., cellular) communication module, the teachings, systems and/or methodologies presented herein are not limited to employing only these specific technologies, and may involve other operations/technology in a manner consistent with the present disclosure.

FIG. 1 discloses an example of activity that may occur in device 100. Device 100 may be any device comprising at least communication and processing resources capable of carrying out activities such as will be described below in regard to the various embodiments disclosed herein. While particular features will be disclosed in regard to FIG. 2, various examples of device 100 may comprise, but are not limited to, a mobile communication device such as a cellular handset, a smart phone, etc. based on the Android® operating system (OS) from the Google Corporation, iOS® from the Apple Corporation, Windows® OS from the Microsoft Corporation, Mac OS from the Apple Corporation, Tizen™ OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, a Surface® from the Microsoft Corporation, Galaxy Tab® from the Samsung Corporation, a Kindle Fire® from the Amazon Corporation, etc., an Ultrabook® including a low-power chipset manufactured by Intel Corporation, netbooks, a notebook, a laptop, a palmtop, etc., a wearable devices such as wristwatch form factor computing devices like the Galaxy Gear® from Samsung, eyewear form factor interfaces like Google Glass® from the Google Corporation, etc., a typically stationary computing device such as a desktop computer, a server, a smart television, a small form factor computing solution (e.g., for space-limited computing applications, TV set-top boxes, etc.) like the Next Unit of Computing (NUC) platform from the Intel Corporation, etc.

While device 100 may be any of the example types of devices described above, a readily recognizable context for the present disclosure will be to discuss device 100 in terms of a mobile communication device such as a smart phone. Device 100 may comprise support for both GNSS measurement and wireless communications. GNSS measurement may be employed for various location-related operations such as location determination and/or identification, navigation, etc. Wireless communication may comprise long-range, short-range and/or close-proximity wireless communications and activities that may correspond to these types of communication such as, for example, reading paging information, cellular signal strength measurement (e.g., to determine connectivity to the strongest cell), etc. Examples wireless mediums will be discussed in regard to FIG. 2. The example activity for device 100 illustrated in FIG. 1 shows how wireless activity 102 and GNSS activity 104 may operate to manage system up time 106 in a manner that allows for power conservation.

Consistent with the present disclosure, 108 may correspond to a duration of time that may repeat periodically in a long-range (e.g., cellular) communication system. Within each duration 108 there may be a time period in which wireless communication activity may be allowed to (or planned to) occur. These periods of wireless activity are represented by black blocks of time 110 in wireless activity 102. Wireless activity period 110 may start at any time within duration 108 and may be of any length. For example, wireless activity period 110 may include paging operations that may inform device 100 of incoming wireless voice and/or message data and/or signaling data. Wireless activity period 110 may also include cellular signal measurement that may occur during cell selection or cell reselection to measure best available cellular signal.

Further to wireless activity 102, GNSS activity 104 is illustrated by white blocks 112. GNSS activity may occur at any time and each occurrence may last, for example, 500 ms, is or longer. GNSS activity 104 may comprise, for example, at least receiving wireless GNSS signals from one or more GNSS satellites, and measuring characteristics of the received signals (e.g., timing, intensity, etc.). Typical GNSS location services may measure signals from different GNSS satellites to determine location utilizing trilateration. In at least one embodiment, the GNSS resources may simply measure GNSS signals, while other resources in device 100 perform positioning-related functionality (e.g., location determination, routing, etc.).

System up time 106 comprises grey blocks 114 illustrating a significant amount of time in each frame 108 that system resources may be active based at least on wireless activity 102 or GNSS activity 104. The system resources may include data processing and related resources for processing incoming and/or outgoing wireless data, GNSS measurements, performing location determination, etc. For example, in existing GNSS implementations the system resources may be responsible for GNSS resource timing, control, etc. The GNSS resources may simply measure GNSS signals whenever triggered by the system resources. As a result, "always-on" GNSS operation (e.g., wherein fresh GNSS measurements are available at any time to support the positioning-related requirements of applications in device) requires the system resources in device 100 to be "up" (e.g., operational) for most of duration 108, which may translate into significant power usage.

Consistent with the present disclosure, synchronization 116 demonstrates how linking the operation of GNSS and wireless resources in device 100 may conserve power in device 100. In at least one embodiment, the wireless communication resources in device 100 may take control over managing the GNSS resources from the system resources. As a result, the system resources are no longer required to maintain timing and triggering responsibilities for the GNSS resources. The wireless communication resources may already need to stay active to maintain timing with at least one long-range wireless network (e.g., to maintain TDMA timing with a GSM network), and this timing may also be utilized to trigger signal measurements in the GNSS resources (e.g., to support always-on positioning). In at least one embodiment, the wireless communication resources may transmit a notification to the GNSS resources at the beginning of a period of time when wireless activity is planned or permitted in device 100 (e.g., at the start of a paging period, at the start of a cellular measurement opportunity, etc.). For example, a paging period may be triggered in the one second range (e.g., to read a GSM page block). The notification may cause the GNSS resources to perform measurements during the period of time that the wireless communication resources are also active. The system resources may then request GNSS signal measurements as-needed without having to also handle GNSS resource management (e.g., without first triggering signal measurement). In this manner, time periods of GNSS activity 112 may be triggered to occur during time periods 110 when wireless activity 102 is allowed or planned to occur, and the period of time 118 during which the system resources in device 100 are forced to be active may shrink as shown at 120. In particular, the time period 112 associated with GNSS activity 104 originally appended to wireless activity period 110 within up time duration 114 may now occur within the duration of wireless activity period 110, and thus, up time period 118 is shorter than up time period 114. Reduced up time 118 may result in power conservation as the system resources in device 100 need only be active for half of frame 108 while still having on-demand access to always-on GNSS measurements. Consistent with the present disclosure, it may be possible for GNSS activity period 112 to last longer due to, for example, low GNSS signal strength. However, even if extended GNSS signal sensing occurs power may still be preserved at least for the time that wireless activity period 110 and GNSS activity period 112 overlap.

Figure 2:
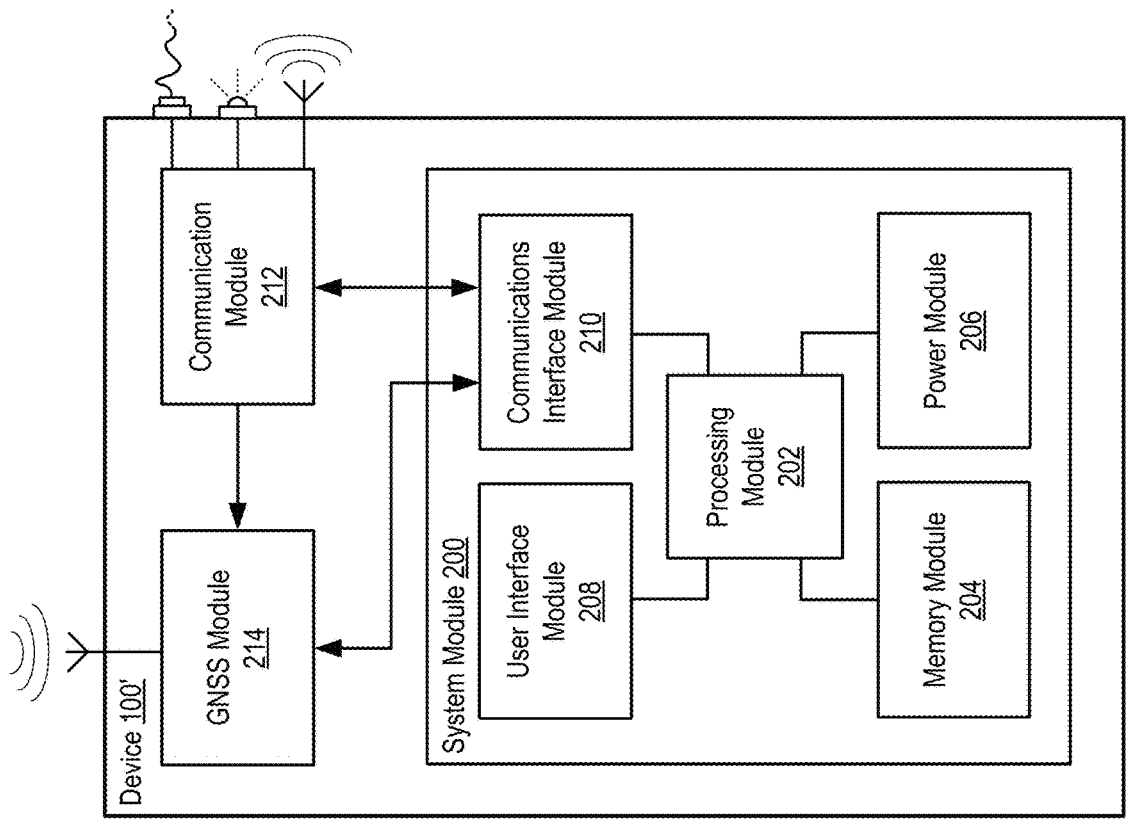
FIG. 2 illustrates an example configuration for a device usable in accordance with at least one embodiment of the present disclosure.

FIG. 2 illustrates an example configuration for a device usable in accordance with at least one embodiment of the present disclosure. In particular, example device 100' may be capable of performing any of the functionality disclosed in FIG. 1. However, device 100' is meant only as an example of an apparatus usable in embodiments consistent with the present disclosure, and is not meant to limit any of these various embodiments to any particular manner of implementation.

Device 100' may comprise, for example, system module 200 (e.g., "system resources") configured to manage operation of device 100'. System module 200 may include, for example, processing module 202, memory module 204, power module 206, user interface module 208 and communication interface module 210. Device 100' may further include communication module 212 (e.g., "communication resources") and GNSS module 214 (e.g., "GNSS resources"). While communication module 212 and GNSS module 214 have been shown as separate from system module 200 in FIG. 2, this example implementation has been illustrated merely for the sake of explanation. Some or all of the functionality associated with communication module 210 and/or GNSS module 214 may also be incorporated into system module 200.

In device 100', processing module 202 may comprise one or more processors situated in separate components, or alternatively one or more processing cores embodied in one component (e.g., in a System-on-a-Chip (SoC) configuration), and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series, Quark product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 100'. Some or all of the functionality commonly associated with the support circuitry may also be included in the same physical package as the processor (e.g., such as in the Sandy Bridge family of processors available from the Intel Corporation).

Processing module 202 may be configured to execute various instructions in device 100'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) and/or read-only memory (ROM) in a fixed or removable format. RAM may include volatile memory configured to hold information during the operation of device 100' such as, for example, static RAM (SRAM) or Dynamic RAM (DRAM). ROM may include non-volatile (NV) memory modules configured based on BIOS, UEFI, etc. to provide instructions when device 100' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 206 may include internal power sources (e.g., a battery, fuel cell, etc.) and/or external power sources (e.g., electromechanical or solar generator, power grid, external fuel cell, etc.), and related circuitry configured to supply device 100' with the power needed to operate. User interface module 208 may include hardware and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface module 208 may be incorporated within device 100' and/or may be coupled to device 100' via a wired or wireless communication medium.

Communication interface module 210 may be configured to manage packet routing and other control functions for communication module 212, which may include resources configured to support wired and/or wireless communications. In some instances, device 100' may comprise more than one communication module 212 (e.g., including separate physical interface modules for wired protocols and/or wireless radios) managed by a centralized communication interface module 210. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, wireless local-area networking (WLAN), Wi-Fi, etc.), long range wireless mediums (e.g., cellular wide-area radio communication technology, satellite-based communications, etc.), electronic communications via sound waves, etc. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. While the embodiment of FIG. 2 illustrates communication interface module 210 being separate from communication module 212, it may also be possible for the functionality of communication interface module 210 and communication module 212 to be incorporated into the same module.

Consistent with the present disclosure, GNSS module 214 may be able to interact with at least communications interface module 210 and communications module 212. In an example of operation, GNSS module 214 may receive at least one notification from communication module 212. The notification may trigger GNSS module 214 to measure at least one GNSS signal (e.g., received from at least one GNSS satellite). Measurement of the GNSS signal may comprise, for example, at least determining the origin of the GNSS signal and noting a transmission time for the GNSS signal (e.g., for determining a travel time for the GNSS signal). GNSS module 214 may receive requests to provide GNSS measurements from communications interface module 210. For example, an application executing in system module 200 may require a determination of location, and may cause communications interface module 210 to request GNSS measurement data from GNSS module 214. Resources in system module 200 (e.g., processing module 202 and/or memory module 204) may process the GNSS measurements received from GNSS module 214 to determine the current location of device 100' (e.g., via trilateration) for the application. While FIG. 3 shows communications module 212 interacting directly with GNSS module 214, it may also be possible for this interaction to be routed through, or coordinated by, communication interface module 210.

Figure 3:
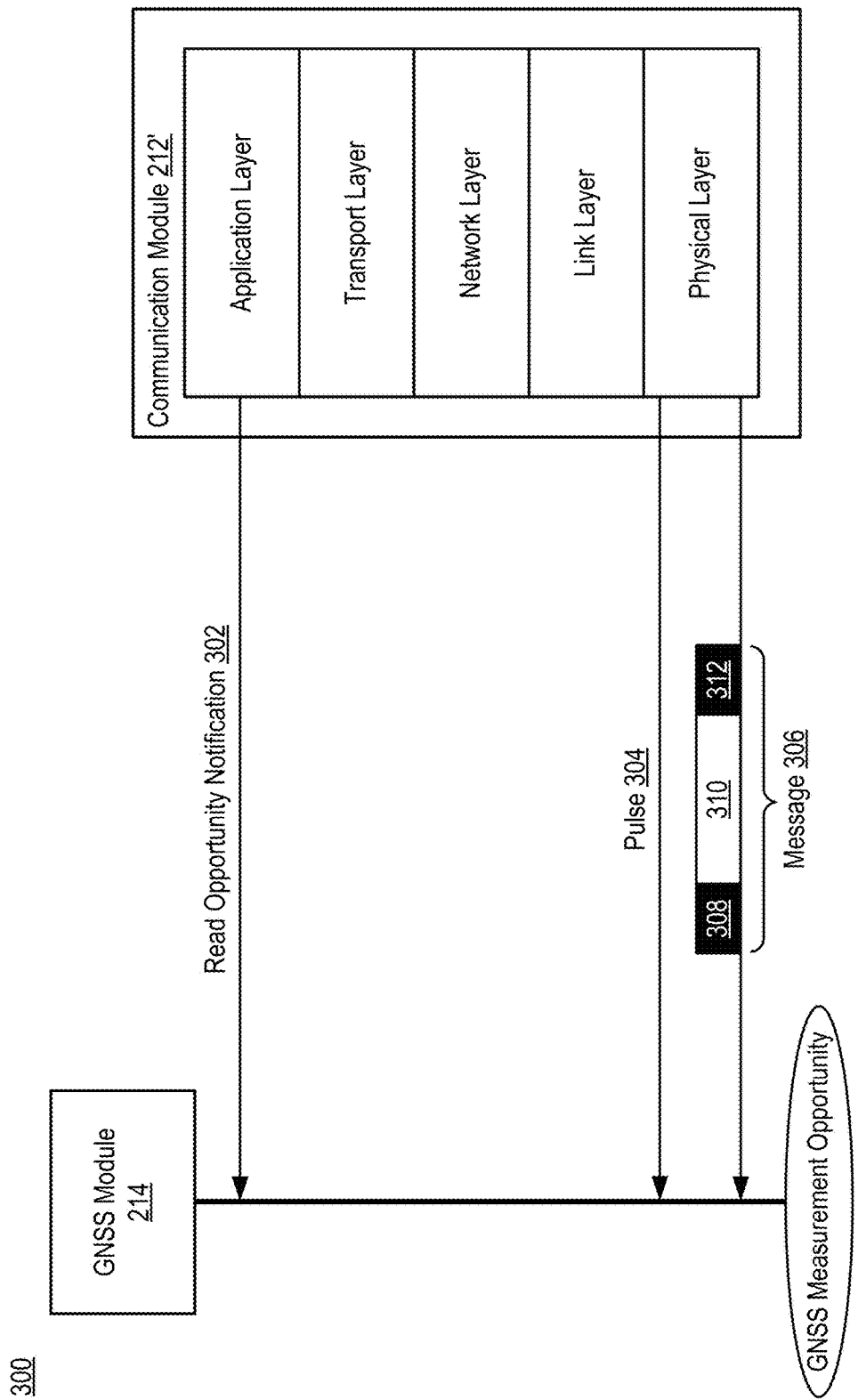
FIG. 3 illustrates an example of notifications in accordance with at least one embodiment of the present disclosure.

FIG. 3 illustrates an example of notifications in accordance with at least one embodiment of the present disclosure. In general, communication module 212' may transmit notifications to GNSS module 214 to trigger GNSS signal measurement (e.g., the receipt of a notification may indicate to GNSS module 214 an opportunity for GNSS signals to be measured). Notifications may be transmitted on a periodic basis, for example, at the beginning of each paging period or GNSS measurement opportunity. This may be convenient timing because communication module 212' is already tracking frame boundaries for use in long-range wireless communication (e.g., cellular communication like GSM).

Notifications may originate from different levels in a protocol stack in communication module 212'. An example protocol stack is illustrated in FIG. 3 including an application layer, a transport layer, a network layer a link layer and a physical layer. Embodiments consistent with the present disclosure may focus on the application and physical layers. The application layer in communication module 212' may include, for example, software for controlling the operation of communication module 212'. In at least one embodiment, the application layer may transmit read opportunity notification 302 to GNSS module 214 (e.g., to application-level software in GNSS 214 via a communication bus in device 100'). Read opportunity notification 302 may be a message designed to inform GNSS module 214 of the start of a time period during which GNSS signals may be measured. Read opportunity notification 302 may at least trigger GNSS signal measurement in GNSS module 214, and may also include data relevant to GNSS signal measurement such as, for example, a type and/or communication medium for communication module 212', a duration for the time period during which GNSS signals may be measured, etc.

Similar to the application layer, the physical layer in communication module 212' may also transmit notifications to GNSS module 214. In at least one embodiment, pulse 304 may be transmitted to GNSS module 214. The receipt of pulse 304 at GNSS module 214 may trigger GNSS signal measurement, may indicate to GNSS module 214 the beginning of a period of time during which GNSS signal measurement may occur, etc. In the same or another embodiment, the physical layer may transmit message 306 to GNSS module 214. Message 306 may comprise at least preamble 308, data 310 and footer 312. For example, preamble 308 and footer 312 may indicate to GNSS module 214 the start and end of a pulse train, respectively, wherein GNSS module 214 may perform GNSS signal measurements in accordance with receiving the pulses in the pulse train. In at least one embodiment, data 310 may include synchronization data relevant to the operation of GNSS module 214 such as, for example, a type of pulse in the pulse train, a frequency of pulse in the pulse train or a radio access technology (RAT) type for communication module 212'. The information included in the synchronization data may indicate the type, rate, etc. of pulses to expect from communication module 212', and thus, may be used to configure the operation of GNSS module 214 to be ready for reception of the pulse train (e.g., to be ready to perform GNSS signal measurements based on receiving the pulses within the pulse train).

Figure 4:
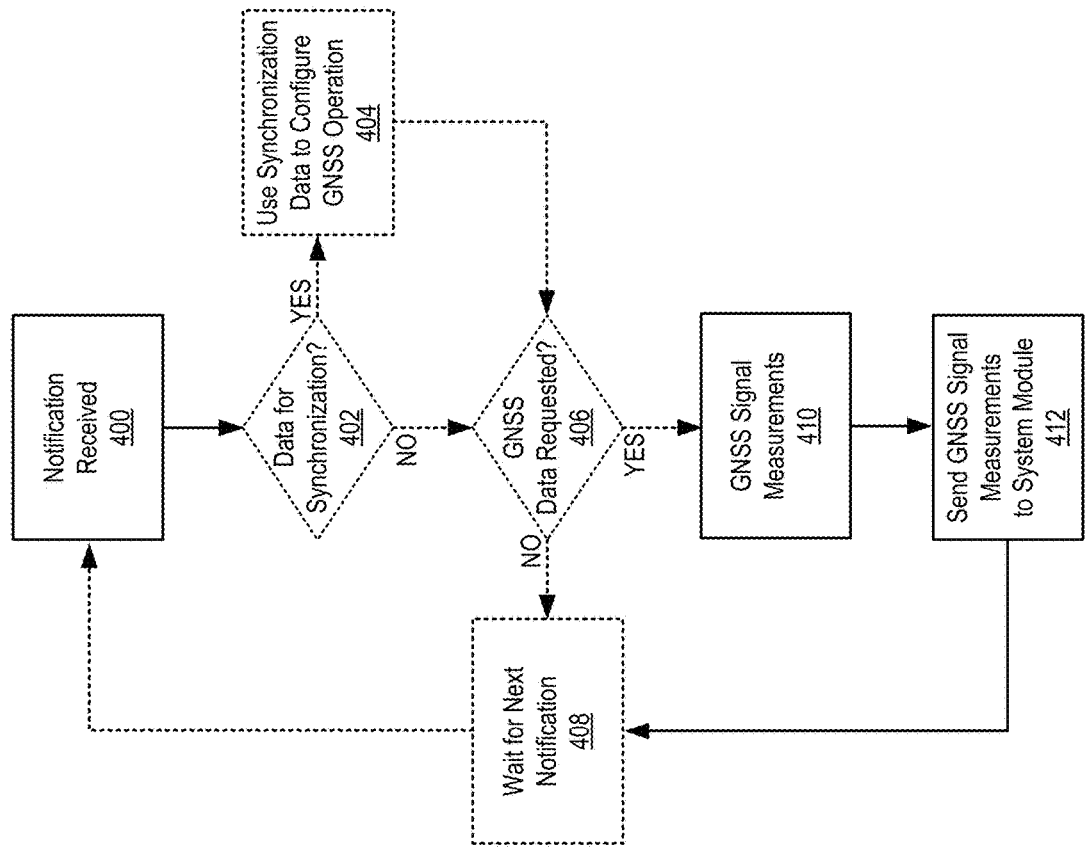
FIG. 4 illustrates example operations for power conservation via GNSS-wireless activity synchronization in accordance with at least one embodiment of the present disclosure.

FIG. 4 illustrates example operations for power conservation via GNSS-cellular activity synchronization in accordance with at least one embodiment of the present disclosure. Initially, operations 402 to 408 may be optional in FIG. 4. For example, without operations 402 to 408 a "simple" notification may be received in operation 400 (e.g., a read opportunity notification 302 or a pulse 304 as shown in FIG. 3) which may indicate the start of a time period during which GNSS signals may be measured. This notification may trigger GNSS signal measurement in operation 410 and the measurements may then be provided to a system module in the device in operation 412. Operation 412 may be followed by operation 400 to await the next notification.

The inclusion of optional operations 402 to 408 will now be described. Operations 402 to 408 pertain to features that may improve power conservation performance through improved wireless/GNSS synchronization, limiting GNSS measurement only to instances when GNSS data is being requested, etc. Following the receipt of a notification in operation 400, a determination may be made in operation 402 as to whether the received notification includes data that may be used to synchronize wireless operation with GNSS operation. Example synchronization data may include a type of pulse in the pulse train, a frequency of pulse in the pulse train or a RAT type for the communication module that sent the notification. If in operation 402 it is determined that the notification comprises data for synchronization, then in operation 404 the data may be used to configure operation of the GNSS module prior to proceeding to operation 406.

Following a determination in operation 402 that the notification received in operation 400 does not comprise data for synchronization as described above, or following configuration of the device utilizing synchronization data in operation 404, a determination may be made in operation 406 as to whether a request has been made for GNSS measurement data (e.g., by the system module). For example, there may be GNSS measurement opportunities that arise where no GNSS measurement data is being requested by the system module. In such an instance there may be no reason for GNSS measurement to be performed. If it is determined in operation 406 that no GNSS measurement data has been requested then in operation 408 the GNSS module may await the reception of further notifications (e.g., in operation 400). If in operation 406 it is determined that GNSS measurement data has been requested, then in operation 410 GNSS signal measurement may occur, and in operation 412 the GNSS measurement data may be provided to the requestor (e.g., to the system module). Sending the GNSS measurement data to the requestor in operation 412 may then be followed by a return to operation 408 to await reception of further notifications (e.g., in operation 400). Consistent with the present disclosure, operations 406 to 408 may be optional in that, in at least one embodiment, it may be assumed that a notification will only be received in operation 400 when a requestor (e.g., the system module) has actually requested GNSS measurement, for example, to support an application that requires updated position information, because positioning is active in an always-on mode (e.g., in the background through a user-configured setting), etc.

While FIG. 4 illustrates operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to power conservation via GNSS-cellular activity synchronization. In general, power may be conserved in a device by setting a GNSS module in a device to operate during a time period when communication resources (e.g., a communication module) in the device are already scheduled to operate, which may conserve power in the device. Synchronization may occur via a notification (e.g., a pulse, a message, etc.) that is transmitted from the communication module to the GNSS module. In this manner, the burden of managing GNSS module operation may be shifted from control resources in the device (e.g., a system module) to the communication module, allowing the system module to remain in a power conservation state (e.g., sleep state) for longer durations and for GNSS signal measurement to occur when the system module is already active.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for power conservation via GNSS-wireless activity synchronization.

According to example 1 there is provided a device to conserve power via global navigation satellite system (GNSS)-cellular activity synchronization. The device may comprise a system module to control operation of the device, a GNSS module to at least measure GNSS signals received from at least one satellite and a communication module to at least facilitate interaction with other devices via at least one wireless medium and cause GNSS module operation to become synchronized with communication module operation.

Example 2 may include the elements of example 1, wherein in causing GNSS module operation to become synchronized the communication module is to cause the GNSS module to be active during a time period when the communication module is also scheduled to be active.

Example 3 may include the elements of any of examples 1 to 2, wherein in causing GNSS module operation to become synchronized the communication module is to transmit a notification to the GNSS module.

Example 4 may include the elements of example 3, wherein the notification is a message comprising at least a preamble sequence, data and a footer sequence, at least the preamble sequence and the footer sequence allowing the GNSS module to detect a start and an end of a pulse train, respectively.

Example 5 may include the elements of example 4, wherein the message data comprises synchronization data including at least one of a type of pulse, a frequency of pulse or a radio access technology (RAT) type.

Example 6 may include the elements of any of examples 4 to 5, wherein the message is transmitted from a physical layer of the communication module.

Example 7 may include the elements of any of examples 3 to 6, wherein the notification comprises at least one pulse indicating when activity is starting for the communication module.

Example 8 may include the elements of example 7 wherein the start of activity for the communication module comprises a start of a duration of time wherein at least one of paging operations or cellular signal measurement are performed by the communication module.

Example 9 may include the elements of any of examples 7 to 8, wherein the pulse is transmitted from a physical layer of the communication module.

Example 10 may include the elements of any of examples 3 to 9, wherein the notification comprises an indication of an opportunity for GNSS module operation provided to the GNSS module by communication module software.

Example 11 may include the elements of any of examples 1 to 10, wherein the system module is further to request the measurements of the GNSS signals from the GNSS module.

Example 12 may include the elements of example 11, wherein at least one of an application executed by the system module or positioning functionality in the device being generally active in an always-on operational mode causes the system module to request the measurements.

Example 13 may include the elements of any of examples 11 to 12, wherein the GNSS module is further to provide the measurements of the GNSS signals to the system module upon receiving the request from the system module.

Example 14 may include the elements of any of examples 1 to 13, wherein GNSS module functionality and the communication module functionality are integrated within a single module in the device.

Example 15 may include the elements of any of examples 1 to 14, wherein the system module is further to request the measurements of the GNSS signals from the GNSS module and the GNSS module is further to provide the measurements of the GNSS signals to the system module upon receiving the request from the system module.

Example 16 may include the elements of any of examples 1 to 15, wherein the device is a mobile communication device.

According to example 17 there is provided a method for synchronizing global navigation satellite system (GNSS) and cellular activity in a device. The method may comprise receiving a synchronization notification at a GNSS module in a device from a communication module also in the device and initiating measurement of GNSS signals based on the notification.

Example 18 may include the elements of example 17, wherein the notification is a message comprising at least a preamble sequence, data and a footer sequence, at least the preamble sequence and the footer sequence allowing the GNSS module to detect a start and an end of a pulse train, respectively.

Example 19 may include the elements of example 18, wherein the message data comprises synchronization data including at least one of a type of pulse, a frequency of pulse or a radio access technology (RAT) type.

Example 20 may include the elements of any of examples 17 to 19, wherein the notification comprises a pulse indicating when activity is starting for the communication module.

Example 21 may include the elements of any of examples 17 to 20, wherein the notification comprises an indication of an opportunity for GNSS module operation provided by communication module software.

Example 22 may include the elements of example 21, wherein the notification comprises an indication from the communication module software to the GNSS module to read at least one measurement.

Example 23 may include the elements of any of examples 17 to 22, and may further comprise receiving a request from a system module in the device for the measurements of the GNSS signals and providing the measurements of the GNSS signals to the system module.

According to example 24 there is provided a system including at least a device arranged to perform the method of any of the above examples 17 to 23.

According to example 25 there is provided a chipset arranged to perform the method of any of the above examples 17 to 23.

According to example 26 there is provided at least one machine readable medium comprising a plurality of instructions that, in response to be being executed on a computing device, cause the computing device to carry out the method according to any of the above examples 17 to 23.

According to example 27 there is provided a device configured to synchronize global navigation satellite system (GNSS) and cellular activity, the device being arranged to perform the method of any of the above examples 17 to 23.

According to example 28 there is provided a system for synchronizing global navigation satellite system (GNSS) and cellular activity in a device. The system may comprise means for receiving a synchronization notification in a GNSS module in a device from a communication module also in the device and means for initiating measurement of GNSS signals based on the synchronization notification.

Example 29 may include the elements of example 28, wherein the notification is a message comprising at least a preamble sequence, data and a footer sequence, at least the preamble sequence and footer sequence allowing the GNSS module to detect the start and end of a pulse train, respectively.

Example 30 may include the elements of example 29, wherein the message data comprises synchronization data including at least one of a type of pulse, a frequency of pulse or a radio access technology (RAT) type.

Example 31 may include the elements of any of examples 28 to 30, wherein the notification comprises a pulse indicating when activity is starting for the communication module.

Example 32 may include the elements of any of examples 28 to 31, wherein the notification comprises an indication of an opportunity for GNSS module operation provided by communication module software.

Example 33 may include the elements of example 32, wherein the notification comprises an indication from the communication module software to the GNSS module to read at least one measurement.

Example 34 may include the elements of any of examples 28 to 33, any may further comprise means for receiving a request from a system module in the device for the measurements of the GNSS signals and means for providing the measurements of the GNSS signals to the system module.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device to conserve power via global navigation satellite system (GNSS)-cellular activity synchronization, comprising:
    system circuitry to control operation of the device;
    GNSS circuitry to at least measure GNSS signals received from at least one satellite; and
    communication circuitry to at least:
        facilitate communication via at least one wireless medium; and
        cause GNSS circuitry operation to become synchronized with communication circuitry operation by transmitting a notification to the GNSS circuitry.

2. The device of claim 1, wherein in causing GNSS circuitry operation to become synchronized the communication circuitry is to cause the GNSS circuitry to be active during a time period when the communication circuitry is also scheduled to be active.

3. The device of claim 1, wherein the notification is a message comprising at least a preamble sequence, data and a footer sequence, at least the preamble sequence and the footer sequence allowing the GNSS circuitry to detect a start and an end of a pulse train, respectively.

4. The device of claim 3, wherein the message data comprises synchronization data including at least one of a type of pulse, a frequency of pulse or a radio access technology (RAT) type.

5. The device of claim 1, wherein the notification comprises at least one pulse indicating when activity is starting for the communication circuitry.

6. The device of claim 5 wherein the start of activity for the communication circuitry comprises a start of a duration of time wherein at least one of paging operations or cellular signal measurement are performed by the communication circuitry.

7. The device of claim 1, wherein the notification comprises an indication of an opportunity for GNSS circuitry operation provided to the GNSS circuitry by software executed by the communication circuitry.

8. The device of claim 1, wherein the system circuitry is further to request the measurements of the GNSS signals from the GNSS circuitry.

9. The device of claim 8, wherein the GNSS circuitry is further to provide the measurements of the GNSS signals to the system circuitry upon receiving the request from the system circuitry.

10. The device of claim 1, wherein GNSS circuitry functionality and the communication circuitry functionality are integrated within a single set of circuitry in the device.

11. A method for synchronizing global navigation satellite system (GNSS) and cellular activity in a device, comprising:
    receiving a synchronization notification at GNSS circuitry in a device from communication circuitry also in the device; and
    initiating measurement of GNSS signals based on the notification.

12. The method of claim 11, wherein the notification is a message comprising at least a preamble sequence, data and a footer sequence, at least the preamble sequence and the footer sequence allowing the GNSS circuitry to detect a start and an end of a pulse train, respectively.

13. The method of claim 12, wherein the message data comprises synchronization data including at least one of a type of pulse, a frequency of pulse or a radio access technology (RAT) type.

14. The method of claim 11, wherein the notification comprises a pulse indicating when activity is starting for the communication circuitry.

15. The method of claim 11, wherein the notification comprises an indication of an opportunity for GNSS circuitry operation provided by software executed by the communication circuitry.

16. The method of claim 15, wherein the notification comprises an indication from the communication circuitry software to the GNSS circuitry to read at least one measurement.

17. The method of claim 11, further comprising:
    receiving a request from a system circuitry in the device for the measurements of the GNSS signals; and
    providing the measurements of the GNSS signals to the system circuitry.

18. At least one machine-readable storage medium having stored thereon, individually or in combination, instructions for synchronizing global navigation satellite system (GNSS) and cellular activity in a device that, when executed by one or more processors, cause the one or more processors to:
    receive a synchronization notification in GNSS circuitry in a device from communication circuitry also in the device; and
    initiate measurement of GNSS signals based on the synchronization notification.

19. The medium of claim 18, wherein the notification is a message comprising at least a preamble sequence, data and a footer sequence, at least the preamble sequence and footer sequence allowing the GNSS circuitry to detect the start and end of a pulse train, respectively.

20. The medium of claim 19, wherein the message data comprises synchronization data including at least one of a type of pulse, a frequency of pulse or a radio access technology (RAT) type.

21. The medium of claim 18, wherein the notification comprises a pulse indicating when activity is starting for the communication circuitry.

22. The medium of claim 18, wherein the notification comprises an indication of an opportunity for GNSS circuitry operation provided by software executed by the communication circuitry.

23. The medium of claim 22, wherein the notification comprises an indication from the communication circuitry software to the GNSS circuitry to read at least one measurement.

24. The medium of claim 18, further comprising instructions that, when executed by one or more processors, cause the one or more processors to:
- receive a request from a system circuitry in the device for the measurements of the GNSS signals; and
- provide the measurements of the GNSS signals to the system circuitry.

* * * * *